United States Patent [19]

Rieck et al.

[11] Patent Number: 4,768,282
[45] Date of Patent: Sep. 6, 1988

[54] TOOLING QUICK RELEASE/CHANGE APPARATUS

[75] Inventors: Gerald C. Rieck, Sterling Heights; Antoni J. Malarz, Troy, both of Mich.

[73] Assignee: General Motors Corporation, Detroit, Mich.

[21] Appl. No.: 39,317

[22] Filed: Apr. 16, 1987

[51] Int. Cl.⁴ .................................. B23Q 3/155
[52] U.S. Cl. .................................. 29/568; 279/1 B; 279/74; 408/237 R; 409/234
[58] Field of Search ............... 29/568; 409/231, 232, 409/234, 233; 279/1 A, 1 Q, 1 ME, 1 B, 1 L, 66, 74, 75; 408/239 R, 239 A, 238

[56] References Cited

U.S. PATENT DOCUMENTS

| | | | |
|---|---|---|---|
| 2,967,462 | 1/1961 | Yogus | 405/232 |
| 3,554,080 | 1/1971 | Herrmann | 409/234 |
| 3,684,303 | 8/1972 | Serra | 409/231 |
| 3,730,637 | 5/1973 | Cellini | 409/232 |
| 3,895,881 | 7/1975 | Langlois | 409/232 |
| 3,898,911 | 8/1975 | De Caussin | 409/233 |
| 4,238,167 | 12/1980 | Brugger | 409/232 |
| 4,436,463 | 3/1984 | Rea | 409/232 |
| 4,478,541 | 10/1984 | Okada et al. | 409/232 |
| 4,525,918 | 7/1985 | Puritz | 29/568 |
| 4,575,293 | 3/1986 | Berti | 409/234 |
| 4,583,892 | 4/1986 | Armbruckner | 409/231 X |
| 4,607,989 | 8/1986 | Kitamura | 409/232 |
| 4,636,135 | 1/1987 | Bancon | 29/26 A X |
| 4,680,999 | 7/1987 | Kojima et al. | 29/568 X |

FOREIGN PATENT DOCUMENTS

| | | | |
|---|---|---|---|
| 3341252 | 5/1985 | Fed. Rep. of Germany | 29/568 |
| 123239 | 7/1985 | Japan | 29/568 |
| 8502138 | 5/1985 | PCT Int'l Appl. | 29/568 |
| 1342470 | 1/1974 | United Kingdom | 29/568 |

*Primary Examiner*—William R. Briggs
*Attorney, Agent, or Firm*—Ernest E. Helms

[57] ABSTRACT

The present invention provides an apparatus and method of utilization of the same of a quick change tool coupling for a rotational metal working or like machine. The present invention provides a tool holding coupling for use with machines with an automatic tool exchanger. Use of the present invention allows the elimination of the drawbar mechanism commonly used in standard metal working machines, while providing axial bending rigidity for the tool.

7 Claims, 3 Drawing Sheets

TOOLING QUICK RELEASE/CHANGE APPARATUS

FIELD OF THE INVENTION

The present invention relates to machine tools with automatic tool change capability. More particularly, the present invention relates to machine tools as described above with multiple spindle drilling heads.

DISCLOSURE STATEMENT

It is well known to provide high speed metal working machines with automatic tool change capability. The typical machine has a tool magazine which holds a variety of metal working tools. Each tool is placed in a tool holder (alternatively referred to as the tool adapter) which has a standard machine tool taper. At the end of the taper is a retention knob. The tool holder is held to the spindle of the metal working machine by a collet connected with a drawbar which projects into the machine. The drawbar via the collet pulls on the retention knob of the tool holder. A locking force to retain the position of the drawbar is supplied by a stack of bevel washers.

To release the tool holder from the spindle, a hydraulic cylinder is used to push on the drawbar. The collet has a tendency to naturally spring radially outward. Therefore when the collet is pushed forward (towards the tool holder) by the hydraulic cylinder, the collet releases the knob of the tool holder. The tool holder is then pulled from the spindle by a tool change gripper. (This is a generic device commonly used in the machine tool industry.) This gripper is a scissors-type mechanism which grabs the tool holder in the standard gripper change V-notch of the tool holder. When the gripper has a secure hold on the tool holder, it is then pulled from the spindle and placed in the tool storage rack of the machine. A new tool holder is grasped and brought back for insertion in the spindle.

Shortcomings of the above-noted method and apparatus are the size, amount and complexity of the drawbar mechanism. When multi-spindle heads are adapted to a single-spindle machine tool, there is not sufficient room for the long drawbar, spring stack and hydraulic cylinders required for each spindle. Therefore the current method used with multi-spindle heads to give the tool the rigidity required is to bolt the tool holder to the spindle, removing and replacing the bolts along with the tool holder when making a tool change. The above method is slower than desired.

It is desirable to provide an apparatus and method of utilization of the same of a quick release tool holder which can be used on multi-spindle heads without the required drawbar and related mechanism.

DISCLOSURE STATEMENT

To meet the above noted and other desires, the present invention is brought forth. The present invention includes a coupling having male and female members. The female member is attached to the spindle of the machine. The male member (tool holder) has an axial bore with a mounted slider. The slider has a first cam means which can be selectively acted upon by a cam plunger slidably mounted in a bore intersecting with the axial bore. The slider also has a second cam means for interaction with a projection member having a third cam means. Movement of the cam plunger causes the projection member to extend to lock the male member of the coupling to the female member, or in the alternative to retract causing the male member to release from the female member. The present invention allows for quick automatic change of tooling yet providing a torsionally secure and rigid mounting for the tool to the machine. Use of the present invention also eliminates the prior required drawbar and related mechanisms.

It is an object of the present invention to provide an apparatus and method of utilization of the same of a quick exchange tool coupling for a rotating machine having an automatic tool exchanger.

It is another object of the present invention to provide a quick change tool coupling for a rotating machine with an automatic tool exchanger including a female member for connection with the machine, and a male tool holding member for connection with the female member, the male member including a body having a generally axial bore projecting toward the female member with at least one intersecting bore, a slider slidably mounted in the axial bore and having first and second cam means, a cam plunger slidably mounted in the intersecting bore and interacting with the first cam means, whereby movement of the cam plunger imparts movement to the slider when interacting with the first cam means, and a projection member connected with the body having third cam means adapted to interact with the second cam means whereby movement of the slider in a first direction causes the projection member to be extended thereby locking the male member to the female member and movement of the slider in a second direction causes the projection member to be retracted, thereby releasing the male member from the female member.

It is yet another object of the present invention to provide a quick change tool coupling for a rotating machine with an automatic tool exchanger including a female member for connection with the machine having a gear tooth face, a male tool holding member having a gear tooth face for connection with the female member the male member including a body having a generally axial bore projecting toward the female member with a plurality of geometrically spaced transverse bores intersecting with the axial bore, a slider slidably mounted in the axial bore having first and second cam means, a cam plunger slidably mounted in each of the intersecting traverse bores and interacting with the first cam means whereby movement of the cam plungers imparts movement to the slider when interacting with the first cam means, and a collet surrounding the slider connected with the body having third cam means for interacting with the second cam means whereby movement of the slider in a first direction causes the collet third cam means to be extended, thereby locking the male member to the female member, movement of the slider in a second direction causes the third cam means to be retracted thereby releasing the male member from the female member.

It is yet another object of the present invention to provide a method of automatically changing a tool on a rotating machine, said method including connecting a female member of a tool coupling to a machine, holding a tool with a male member of a tool coupling having a body with a generally axial bore projecting towards the female member with at least one intersecting bore, slidably mounting in the axial bore of the male member a slider having first and second cam means, slidably mounting in a bore intersecting with the axial bore a cam plunger interacting with the first cam means, and connecting with the male member a projection member with a third cam means for interacting with the second cam means whereby movement of the slider in a first direction causes the projection member to be extended, thereby locking the male member to the female member and movement of he slider in a second direction causes the projection member to be retracted thereby releasing the male member from the female member.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
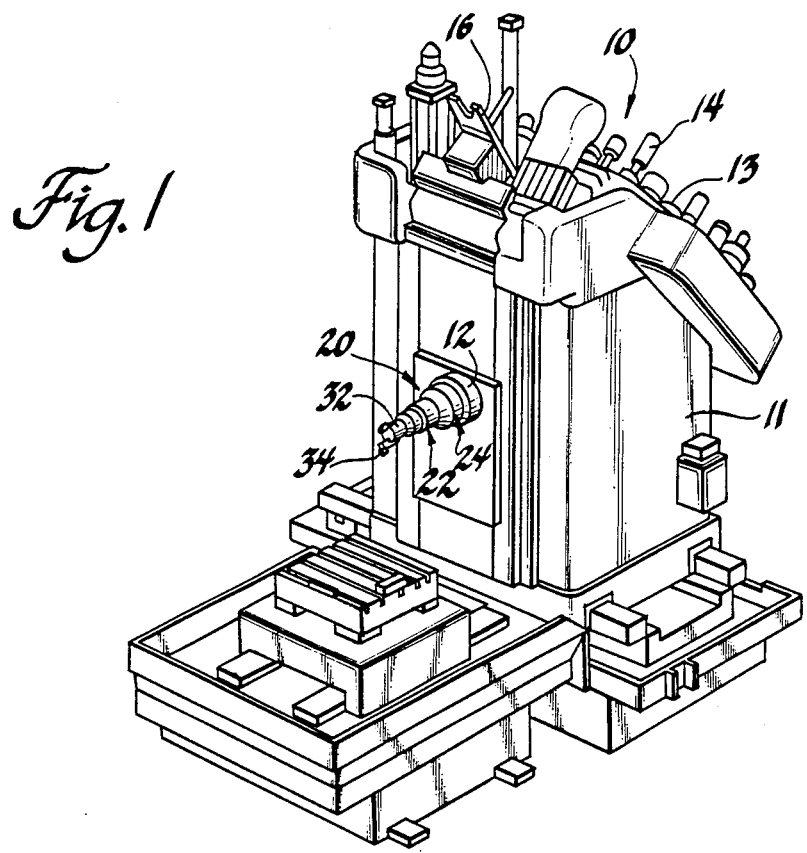
FIG. 1 is a perspective view of a rotational metal working machine.

Referring to FIG. 1, the rotating metal working machine 10 utilizing the present invention has a frame 11 with a single spindle 12. However, if desired, the spindle 12 can be connected with a gear box which in turn would drive a plurality of additional spindles. Located typically on top or on the side of the machine 10 is a tool magazine 13. Also shown is the gripper 16 or automatic tool exchanger which handles a tool 14 by grabbing the tool by its respective tool holder (or adapter) 22.

Figure 2:
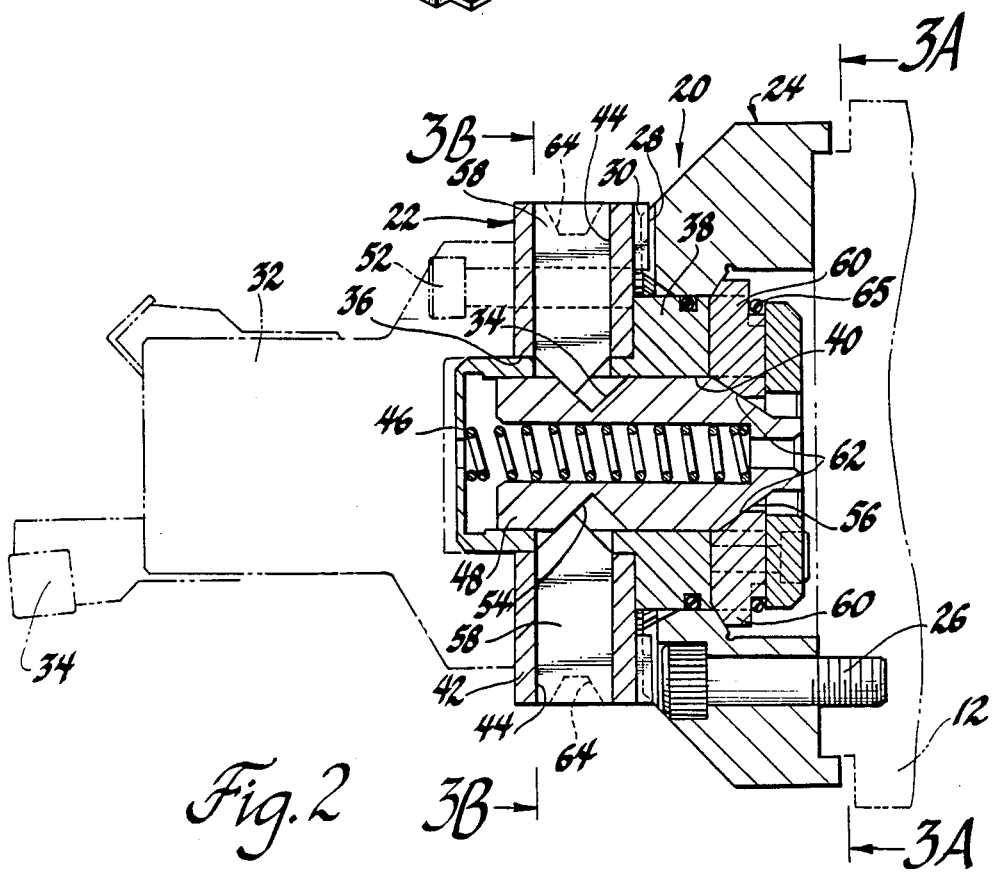
FIG. 2 is a side sectional view of a preferred embodiment of the present invention.
Figure 3A:
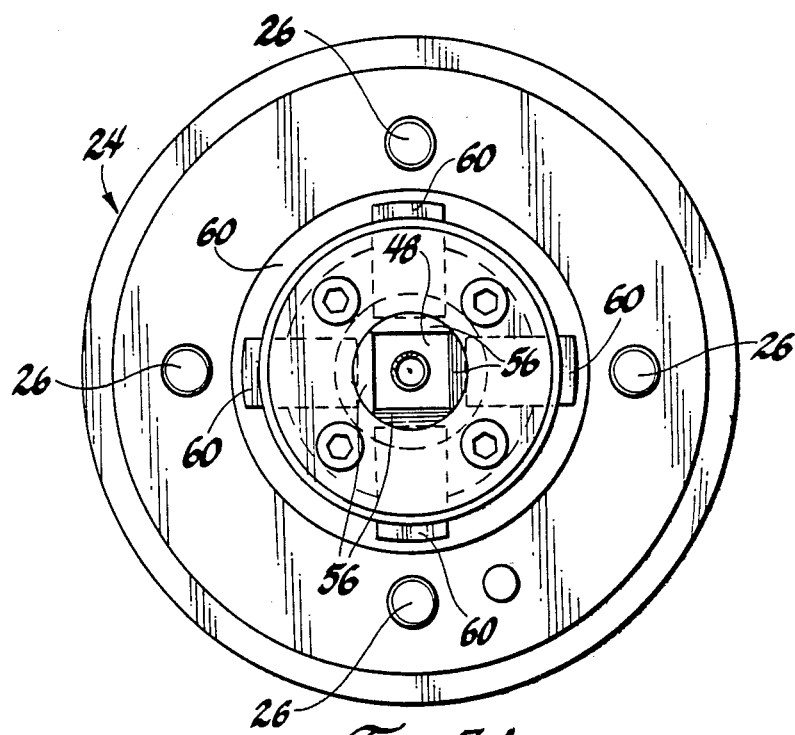
FIGS. 3A and 3B are views taken along lines 3A—3A and 3B—3B of FIG. 2.
Figure 3B:
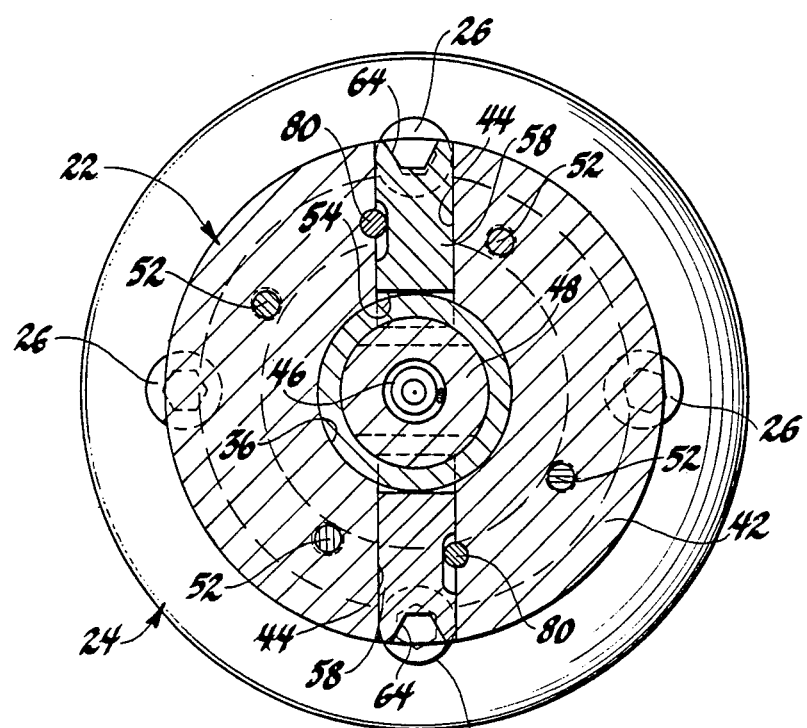

Referring additionally to FIGS. 2, 3A and 3B, the quick change coupling 20 of the present invention has male (tool holder) and female members 22 and 24, respectively. The female member 24 is typically fixably attached to the spindle of the machine by a series of bolts 26. The female member 24 also has a gear toothed face 28 mating with a corresponding gear tooth face 30 of the male member 22. The gear tooth facings provide torsional transfer and alignment between the male 22 and female 24 members. A straight radial tooth gear tooth or a curved tooth design may be utilized for faces 28 and 30 based on the requirements of the application and preferences of the designer.

The male member 22 has a body 32 having one end for holding the tool 34 (shown in phantom) and an opposite end 42 for connection with the female member 24 held together by a series of bolts 52 (only one shown). The male member 22 has a cavity 36 with an insert 38 providing an axial bore 40 projecting towards the female member 24. Intersecting with the axial bore 40 is a plurality of geometrically spaced transverse intersecting bores 44.

Slidably mounted in the axial bore 40 and biased by a spring 46 towards the female member 24 is a slider 48. The slider 48 has a first cam means provided by a V-shaped groove 54 and a second cam means provided by an inclined surface 56 along its end adjacent to the female member 24.

Inserted within the intersecting bores 44 are the cam plungers 58. The cam plungers are positioned to intersect with the first cam means 54 of the slider 48 and interact therewith. Movement of the cam plungers 58 imparts movement to the slider 48 whenever the cam plunger 58 interact with the first cam means 54 of the slider 48. Cam plunger 58 has a notch 64 to allow for insertion of a jaw (not shown) of the gripper 16 to force the cam plungers 58 radially inward towards slider 48. Pins 80 (FIG. 3B) are provided to hold the cam plunges 58 in bores 44 when the spindle 12 is rotating.

The male member 22 also has slidably connected thereto projection members 60. The projection member 60 has a third cam means provided by surface 62 which interacts with the second cam means 56 of the slider 48. When the slider moves in the first direction (towards the female member 24), the second cam means 56 interacts with the third cam means 62 causing the projection members 60 to extend and therefore lock the male member 22 to the female member 24. When slider 48 moves in a second direction, cam plungers 58 are pushing inward, projection members 60 are contracting and the male member 22 is released from the female member 24. In operation, the design of the male member 22 will usually be such that the projection members 60 are radially based outwardly (in the locking position).

When it is desired to change a tool, the gripper jaws (not shown) will fit into notch 64 and push the cam plungers 58 inwardly causing the slider 48 to be pushed away from the female member 24 allowing the projection members 60 to be biased to a retracted position. The retractive force is usually supplied by a coil spring or an oil ring 65 which is looped to encircle all of the projection members. At that time the male member 22 is then released from the female member 24. At this point, the gripper 16 will pull the male member 22 axially outward and away from the female member 24 and return male member 22 and associated tool 34 to the tool storage magazine.

Figure 4:
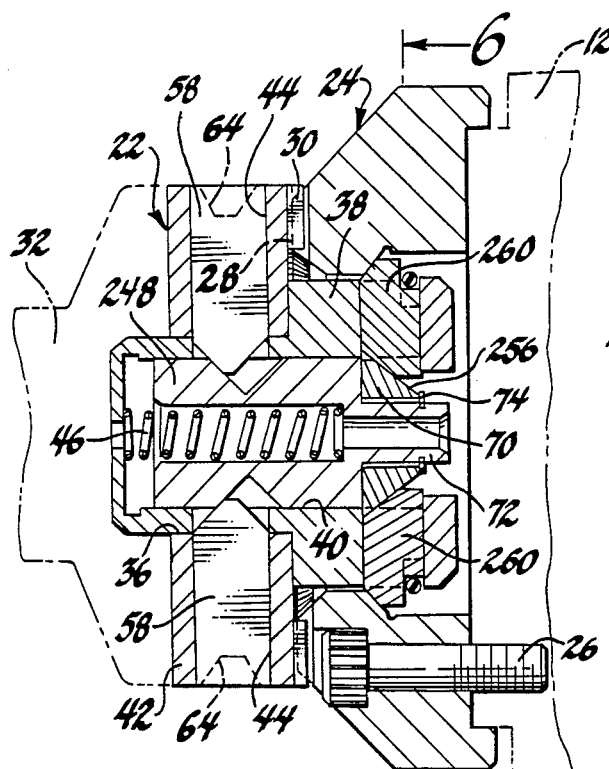
FIGS. 4 and 5 are side sectional views of alternative preferred embodiments of the present invention.
Figure 6:
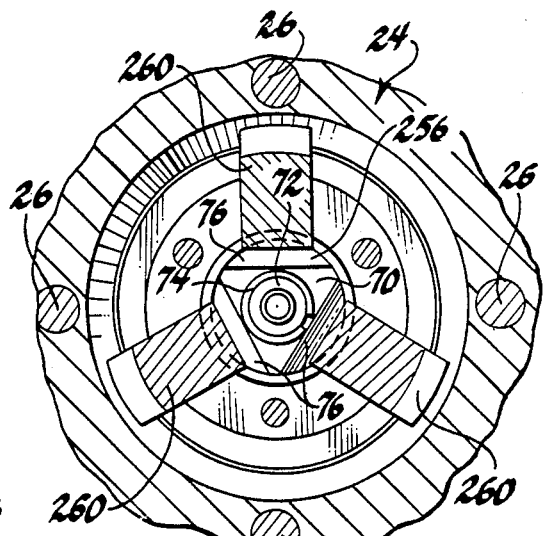
FIG. 6 is a view taken along line 6—6 of FIG. 4.
Figure 5:
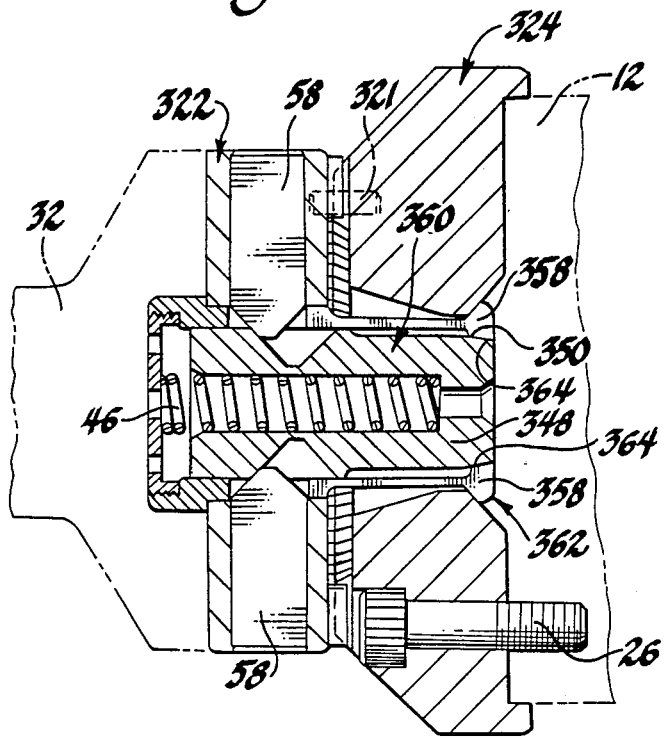

In the embodiment illustrated in FIGS. 4 and 6, parts common to those shown in FIGS. 2 and 3 are given like reference numerals. In FIGS. 4 and 6, the slider 248 has a second cam means 256 which includes ring 70 which surrounds a rod portion 72 of slider 248. Ring 70 has a slight clearance with rod portion 72. Ring 70 is held to rod portion 72 by a snap ring 74. Ring 70 has a series of flats 76 aligned with the projection members 260. The tolerance on the length of the projection members 60 (FIGS. 2 and 3A) is quite precise. If one of the projection members is longer than the remainder of the projection members 60, the movement of slider 48 toward female member 24 may be restrained before all of the projection members 60 are extended outward. The embodiment of FIGS. 4 and 6 overcome the above noted problem by providing a clearance between ring 70 and rod 72 which allows the second cam means 256 to float to compensate for differences in the length of projection members 260. The above configuration allows the dimensional tolerances of the projection members 260 to be somewhat relaxed than that of the projection members 60 in the embodiment illustrated in FIGS. 2 and 3.

Figure 7:
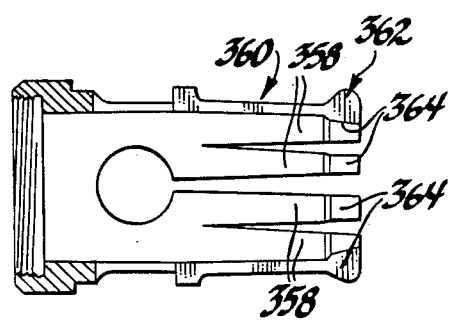
FIG. 7 is a side sectional view of a collet utilized in the embodiment of the present invention illustrated in FIG. 5 of the present invention.

Referring to FIGS. 6, 7 and 8, still another embodiment of the present invention has an alignment pin 321 between the male member 322 and female member 324. The projection member is provided by a collet 360 with a collar 362. The collet 360 is made so that the collar 362 natural elastic reaction is for its fingers 358 to radially project inwardly. When slider 348 projects towards the female member 324, a second cam means 350 interacts with a third cam means 364 of the collet 360 and causes the collet collar 362 to radially extend outwardly thereby locking male member 322 to female member 324 as previously described. As illustrated, the collet 350 has eight fingers 358; however, the amount of fingers utilized may be increased. One advantage of the collet design is that it allows the gripping force to be applied over a greater amount of the interior circumferential surface of the female member thereby giving greater axial bending rigidity.

The present invention provides a method of automatically changing a tool 34 on a rotating machine 11, said method including the following steps:

1. Connecting a female member 24 of a tool coupling 20 to a machine 11;
2. Holding a tool 34 with the body 42 of a male member 22 of a tool coupling 20 having a generally axial bore 40 projecting towards the female member 24 with at least one intersecting bore 44;
3. Slidably mounting in the axial bore 40 of the male member 22 a slider 48 having first 54 and second 56 cam means;
4. Slidably mounting in the intersecting bore 44 a cam plunger 58 interacting with said first cam means 54;
5. Connecting with said male member 22 a projected member 60 with a third cam means 62 for interacting with said second cam means 56 whereby movement of said slider 48 in a first direction causes said projection member 60 to be extended, thereby locking said male member 22 to said female member 24 and movement of said slider 48 in a second direction causes said projection member 60 to be retracted thereby releasing said male member 22 from said female member 24.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A quick change tool coupling for a rotating machine with an automatic tool exchanger, said coupling in combination comprising:
   a female member for connection with said machine; and
   a male tool holding member for connection with said female member, said male member including:
      a body having a generally axial bore projecting toward said female member with at least one intersecting bore;
      a slider slidably mounted in said axial bore and having first and second cam means;
      a cam plunger slidably mounted in said intersecting bore and interacting with said first cam means, whereby movement of said cam plunger imparts movement to said slider when interacting with said first cam means; and
      a projection member connected with said body having third cam means adapted to interact with said second cam means whereby movement of said slider in a first direction causes said projection member to be extended thereby locking said male member to said female member and movement of said slider in a second direction allows said projection member to be biased to a retracted position, thereby releasing said male member from said female member.

2. A quick change tool coupling as described in claim 1 wherein said male and female members have a gear toothed face providing torque transfer and alignment.

3. A quick change tool coupling as described in claim 1 wherein said second cam means surrounds said slider having a clearance with the same.

4. A quick change tool coupling as described in claim 1 wherein said projection member is a collet surrounding said slider.

5. A quick change tool coupling as described in claim 4 wherein said collet third cam surface is naturally biased radially inward.

6. A quick change tool coupling for a rotating machine with an automatic tool exchanger, said coupling in combination comprising:
   a female member for connection with said machine having a gear tooth face; and
   a male tool holding member having a gear tooth face for connection with said female member, said male member including:
      a body having a generally axial bore projecting toward said female member with a plurality of geometrically spaced transverse bores intersecting with said axial bore;
      a slider slidably mounted in said axial bore having first and second cam means;
      a cam plunger slidably mounted in each of said intersecting traverse bores and interacting with said first cam means whereby movement of said cam plungers imparts movement to said slider when interacting with said first cam means; and
      a collet surrounding said slider connected with said body having third cam means for interacting with said second cam means whereby movement of said slider in a first direction causes said collet third cam means to be extended, thereby locking said male member to said female member, and movement of said slider in a second direction allows said third cam means to be biased to a retracted position thereby releasing said male member from said female member.

7. A method of automatically changing a tool on a rotating machine, said method in combination comprising:
   connecting a female member of a tool coupling to a machine;
   holding a male member of a tool coupling having a body with a generally axial bore projecting towards the female member with at least one intersecting bore;
   slidably mounting in the axial bore of the male member a slider having first and second cam means;
   slidably mounting in the bore intersecting with the axial bore a cam plunger interacting with said first cam means; and
   connecting with said male member a projection member with a third cam means for interacting with said second cam means whereby movement of said slider in a first direction causes said projection member to be extended, thereby locking said male member to said female member and movement of said slider in a second direction causes said projection member to be retracted thereby releasing said male member from said female member.

* * * * *